(12) United States Patent
Moore

(10) Patent No.: US 11,884,101 B2
(45) Date of Patent: Jan. 30, 2024

(54) OMNI-WHEEL BRAKE DEVICES AND METHODS FOR BRAKING AN OMNI-WHEEL

(71) Applicant: Toyota Motor North America, Inc., Plano, TX (US)

(72) Inventor: Douglas A. Moore, Fairview, TX (US)

(73) Assignee: Toyota Motor North America, Inc., Plano, TX (US)

( * ) Notice: Subject to any disclaimer, the term of this patent is extended or adjusted under 35 U.S.C. 154(b) by 605 days.

(21) Appl. No.: 16/682,411

(22) Filed: Nov. 13, 2019

(65) Prior Publication Data

US 2020/0391544 A1 Dec. 17, 2020

Related U.S. Application Data

(60) Provisional application No. 62/860,495, filed on Jun. 12, 2019.

(51) Int. Cl.
| | | |
|---|---|---|
| *B60B 19/12* | (2006.01) | |
| *B60T 1/04* | (2006.01) | |
| *F16D 49/14* | (2006.01) | |
| *F16D 65/16* | (2006.01) | |
| *B60B 19/00* | (2006.01) | |

(Continued)

(52) U.S. Cl.
CPC ............ *B60B 19/003* (2013.01); *B60B 19/12* (2013.01); *B60T 1/04* (2013.01); *F16D 49/00* (2013.01); *F16D 49/04* (2013.01); *F16D 49/14* (2013.01); *F16D 49/16* (2013.01); *F16D 51/00* (2013.01); *F16D 65/16* (2013.01); *B60B 27/0047* (2013.01); *B60B 2900/351* (2013.01); *F16D 2121/08* (2013.01); *F16D 2121/14* (2013.01);

(Continued)

(58) Field of Classification Search
CPC ...... F16D 49/12; F16D 49/14; F16D 2121/08; F16D 2125/12; F16D 2125/14; F16D 2069/007; F16D 2069/001; F16D 2065/026; F16D 49/06; F16D 65/16; B60T 1/04; B60B 19/003; B60B 19/12
USPC ........................................................ 301/5.23
See application file for complete search history.

(56) References Cited

U.S. PATENT DOCUMENTS

| | | | | |
|---|---|---|---|---|
| 1,983,751 A | * | 12/1934 | Goodyear | ............... F16D 51/14 |
| | | | | 188/18 R |
| 2,141,645 A | * | 12/1938 | Fawick | ..................... F16D 3/82 |
| | | | | 285/97 |

(Continued)

FOREIGN PATENT DOCUMENTS

| | | | | |
|---|---|---|---|---|
| GB | 2408692 A | | 6/2005 | |
| JP | 2000104762 A | * | 4/2000 | ............. B60T 1/067 |

(Continued)

*Primary Examiner* — Thomas J Williams
(74) *Attorney, Agent, or Firm* — Dinsmore & Shohl LLP

(57) ABSTRACT

An omni-wheel may include a shaft, a plurality of rollers, and a braking device. The plurality of rollers may be circumferentially arranged about the shaft and arranged radially outward from the shaft. The braking device may include a fluid-filled bladder and a plurality of braking pads. The fluid-filled bladder may be circumferentially arranged about the shaft. The plurality of braking pads may be arranged between the fluid-filled bladder and the plurality of rollers. The fluid-filled bladder may expand radially outward when pressurized, displacing the plurality of braking pads radially outward to contact the plurality of rollers, preventing rotation of the rollers.

15 Claims, 6 Drawing Sheets

(51) Int. Cl.
  *F16D 49/00* (2006.01)
  *F16D 49/16* (2006.01)
  *F16D 49/04* (2006.01)
  *F16D 51/00* (2006.01)
  *B60B 27/00* (2006.01)
  *F16D 121/14* (2012.01)
  *F16D 125/60* (2012.01)
  *F16D 125/68* (2012.01)
  *F16D 121/08* (2012.01)

(52) U.S. Cl.
  CPC ...... *F16D 2125/60* (2013.01); *F16D 2125/68* (2013.01)

(56) References Cited

U.S. PATENT DOCUMENTS

| | | | | |
|---|---|---|---|---|
| 2,251,443 | A * | 8/1941 | Fawick | F16D 25/046 188/367 |
| 2,414,675 | A * | 1/1947 | Stelzer | F16D 51/46 188/78 |
| 2,449,383 | A * | 9/1948 | Hunter | F16D 51/08 188/335 |
| 2,944,636 | A * | 7/1960 | Rockwell | B60T 1/04 188/29 |
| 4,497,398 | A * | 2/1985 | Patel | F16D 51/08 192/79 |
| 4,646,885 | A * | 3/1987 | Giardini | F16D 53/00 188/78 |
| 4,650,041 | A * | 3/1987 | Giardini | F16D 53/00 188/325 |
| 6,374,961 | B1 * | 4/2002 | Koike | F16D 65/14 188/77 R |
| 2005/0199450 | A1 * | 9/2005 | Campbell | B60T 11/22 188/24.15 |
| 2008/0018167 | A1 | 1/2008 | Fuji | |
| 2010/0243342 | A1 | 9/2010 | Wu et al. | |
| 2016/0121709 | A1 | 5/2016 | Shin | |
| 2018/0050563 | A1 | 2/2018 | Zhang et al. | |
| 2018/0250178 | A1 * | 9/2018 | Paul | A61G 1/0237 |
| 2020/0391544 | A1 * | 12/2020 | Moore | B60B 19/12 |
| 2020/0391546 | A1 * | 12/2020 | Moore | F16D 49/04 |

FOREIGN PATENT DOCUMENTS

| | | |
|---|---|---|
| JP | 3820239 B2 | 9/2006 |
| WO | 2011041915 A1 | 4/2011 |
| WO | 2011113562 A2 | 9/2011 |
| WO | WO-2018151128 A1 * | 8/2018 ............... A61G 5/02 |

* cited by examiner

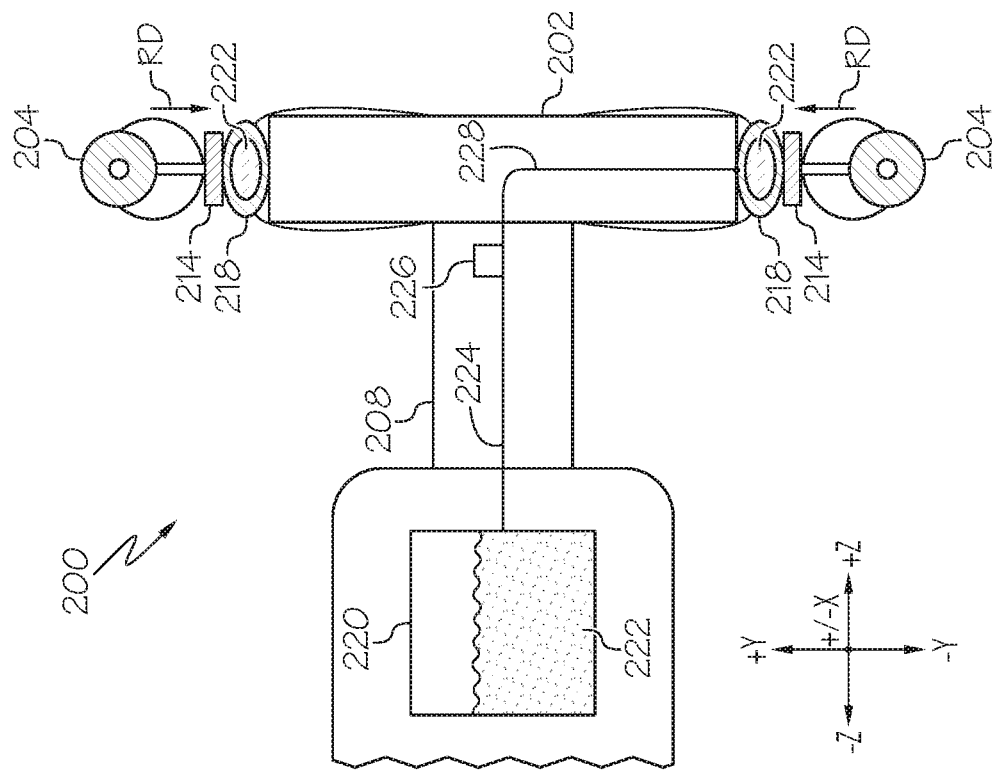
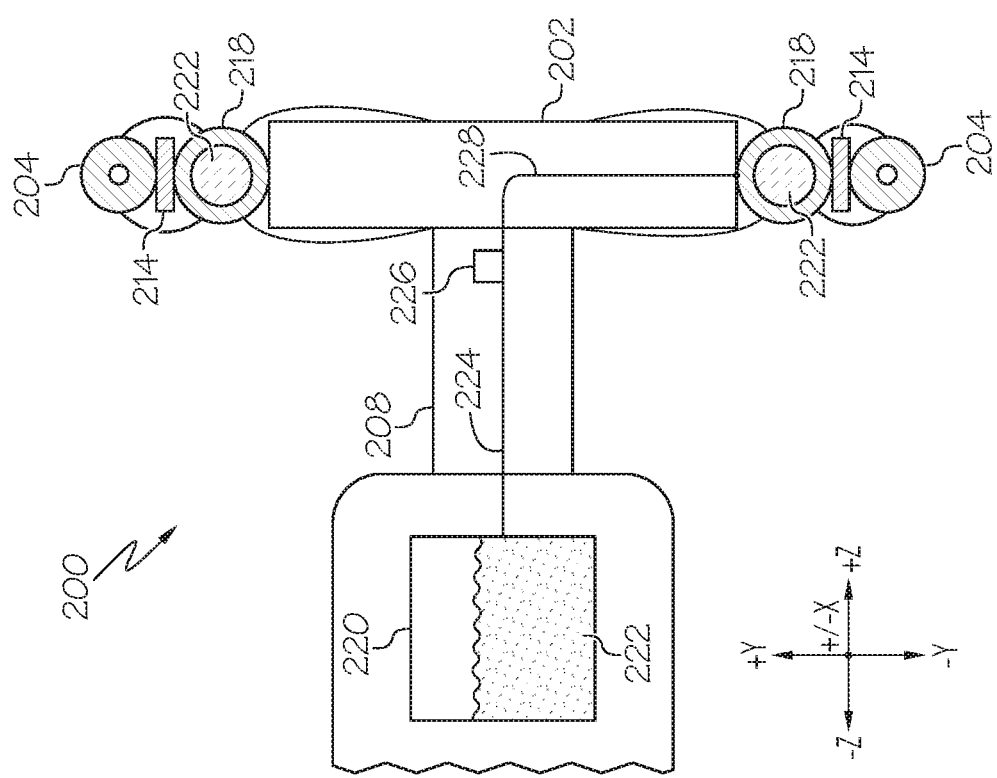

OMNI-WHEEL BRAKE DEVICES AND METHODS FOR BRAKING AN OMNI-WHEEL

CROSS-REFERENCE TO RELATED APPLICATIONS

This application claims the benefit of U.S. Provisional Application No. 62/860,495, filed Jun. 12, 2019, the entire contents of which is incorporated by reference in its entirety.

TECHNICAL FIELD

The present specification generally relates to omni-wheel brake devices and methods for braking an omni-wheel and, more specifically, to omni-wheel brake devices and methods for braking an omni-wheel which utilize a pressurized fluid-filled bladder.

BACKGROUND

Omni-wheels are wheels with rollers around the circumference that are perpendicular to the circumferential direction. This allows an omni-wheel to operate as a traditional wheel, which would be rolled in the circumferential direction of the wheel (i.e., the longitudinal direction). Additionally, an omni-wheel not only rolls in the circumferential direction, but can also be rolled along its rollers touching the ground perpendicular to the circumferential direction (i.e., the lateral direction). This allows for an increase in maneuverability when compared to traditional wheels. However, current omni-wheels may not include braking mechanisms which can brake the rollers of the omni-wheel to prevent rotation. Additionally, current braking mechanism may only be capable of braking all of the rollers simultaneously, or none of the rollers.

Accordingly, there is a need for alternative omni-wheel braking devices and methods that can brake the rollers of omni-wheels to prevent lateral movement, while also allowing for selective engagement of the rollers of omni-wheels.

SUMMARY

According to a first aspect, an omni-wheel may include a shaft, a plurality of rollers, and a braking device. The plurality of rollers may be circumferentially arranged about the shaft and arranged radially outward from the shaft. The braking device may include a fluid-filled bladder and a plurality of braking pads. The fluid-filled bladder may be circumferentially arranged about the shaft. The plurality of braking pads may be arranged between the fluid-filled bladder and the plurality of rollers. The fluid-filled bladder may expand radially outward when pressurized, displacing the plurality of braking pads radially outward to contact the plurality of rollers, thereby preventing rotation of the rollers.

According to a second aspect, an omni-wheel according to the previous aspect, further including a pump fluidly coupled to the fluid-filled bladder to pressurize and depressurize the fluid-filled bladder.

According to a third aspect, an omni-wheel according to any of the previous aspects, further including a fluid reservoir fluidly coupled to the pump and the fluid-filled bladder.

According to a fourth aspect, an omni-wheel according to any of the previous aspects, wherein the fluid-filled bladder is pressurized with air.

According to a fifth aspect, an omni-wheel according to any of the previous aspects, wherein the fluid-filled bladder is pressurized with water.

According to a sixth aspect, an omni-wheel according to any of the previous aspects, wherein the plurality of braking pads is secured to the fluid-filled bladder.

According to a seventh aspect, an omni-wheel according to any of the previous aspects, wherein the plurality of braking pads are integral with an outer surface of the fluid-filled bladder.

According to an eighth aspect, an omni-wheel may include a shaft, a plurality of roller, and a braking device. The plurality of rollers may be circumferentially arranged about the shaft and arranged radially outward from the shaft. The braking system may include a plurality of braking devices arranged about the shaft, each braking device may include a fluid-filled bladder arranged about the shaft. Each fluid-filled bladder of the braking devices may be radially aligned with an individual roller. The braking pad may be arranged between the fluid-filled bladder and the roller of each braking device. Each fluid-filled bladder of the plurality of fluid-filled bladders may be separately pressurized and expands radially outward when pressurized, displacing a braking pad of the plurality of braking pads radially outward to contact a roller of the plurality of rollers, preventing rotation of the roller.

According to a ninth aspect, an omni-wheel according to any of the previous aspects, further including a pump fluidly coupled to each of the fluid-filled bladders of the braking devices to pressurize and depressurize the fluid-filled bladders.

According to a tenth aspect, an omni-wheel according to any of the previous aspects, further including a fluid reservoir fluidly coupled to the pump and to each of the fluid-filled bladders of the braking devices.

According to an eleventh aspect, an omni-wheel according to any of the previous aspects, wherein the fluid-filled bladders is pressurized with air.

According to a twelfth aspect, an omni-wheel according to any of the previous aspects, wherein the fluid-filled bladders is pressurized with water.

According to a thirteenth aspect, an omni-wheel according to any of the previous aspects, wherein the plurality of braking pads is secured to the plurality of fluid-filled bladders.

According to a fourteenth aspect, an omni-wheel according to any of the previous aspects, wherein the plurality of braking pads are integral with an outer surface of each of the fluid-filled bladders.

According to a fifteenth aspect, a method of braking an omni-wheel may include pressurizing a fluid-filled bladder arranged about a shaft of the omni-wheel. The fluid-filled bladder may be expanded radially outward. The brake pad arranged about the shaft may be displaced radially outward. An at least one roller of the omni-wheel may be contacted with the brake pad. Rotation of the roller may be prevented due to the contact between the brake pad and the roller.

According to a sixteenth aspect, a method of braking an omni-wheel according to any of the previous aspects, the at least one roller of the omni-wheel is prevented from rotating only when contacting the ground.

According to a seventeenth aspect, a method of braking an omni-wheel according to any of the previous aspects, wherein the braking pad is integral with an outer surface of the fluid-filled bladder.

According to an eighteenth aspect, a method of braking an omni-wheel according to any of the previous aspects, wherein the fluid-filled bladder is pressurized via a pump fluidly coupled to the fluid-filled bladder.

According to a nineteenth aspect, a method of braking an omni-wheel according to any of the previous aspects, further including depressurizing the fluid-filled bladder, collapsing the fluid-filled bladder radially inward, displacing the brake pad arranged about the shaft radially inward, and disengaging the brake pad with the at least one roller of the omni-wheel.

According to a twentieth aspect, a method of braking an omni-wheel according to any of the previous aspects, wherein the brake pad is biased radially inward to disengage the at least one roller when the fluid-filled bladder is depressurized.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A schematically depicts a cross-sectional view of the omni-wheel of FIG. 4 taken generally along line 5-5 as viewed along the +/−X-axis of the depicted coordinate axes, according to one or more embodiments shown or described herein;

FIG. 5B schematically depicts a cross-sectional view of the omni-wheel of FIG. 4 taken generally along line 5-5 as viewed along the +/−X-axis of the depicted coordinate axes, according to one or more embodiments shown or described herein.

DETAILED DESCRIPTION

An omni-wheel having a braking device is discussed herein. Omni-wheels allow for both longitudinal and lateral movement of a vehicle equipped with the omni-wheels, without having to turn the wheels. Additionally, by being able to selectively brake the rollers of an omni-wheel, the transition between longitudinal movement and lateral movement can be seamless, while also occurring simultaneously.

Figure 1:
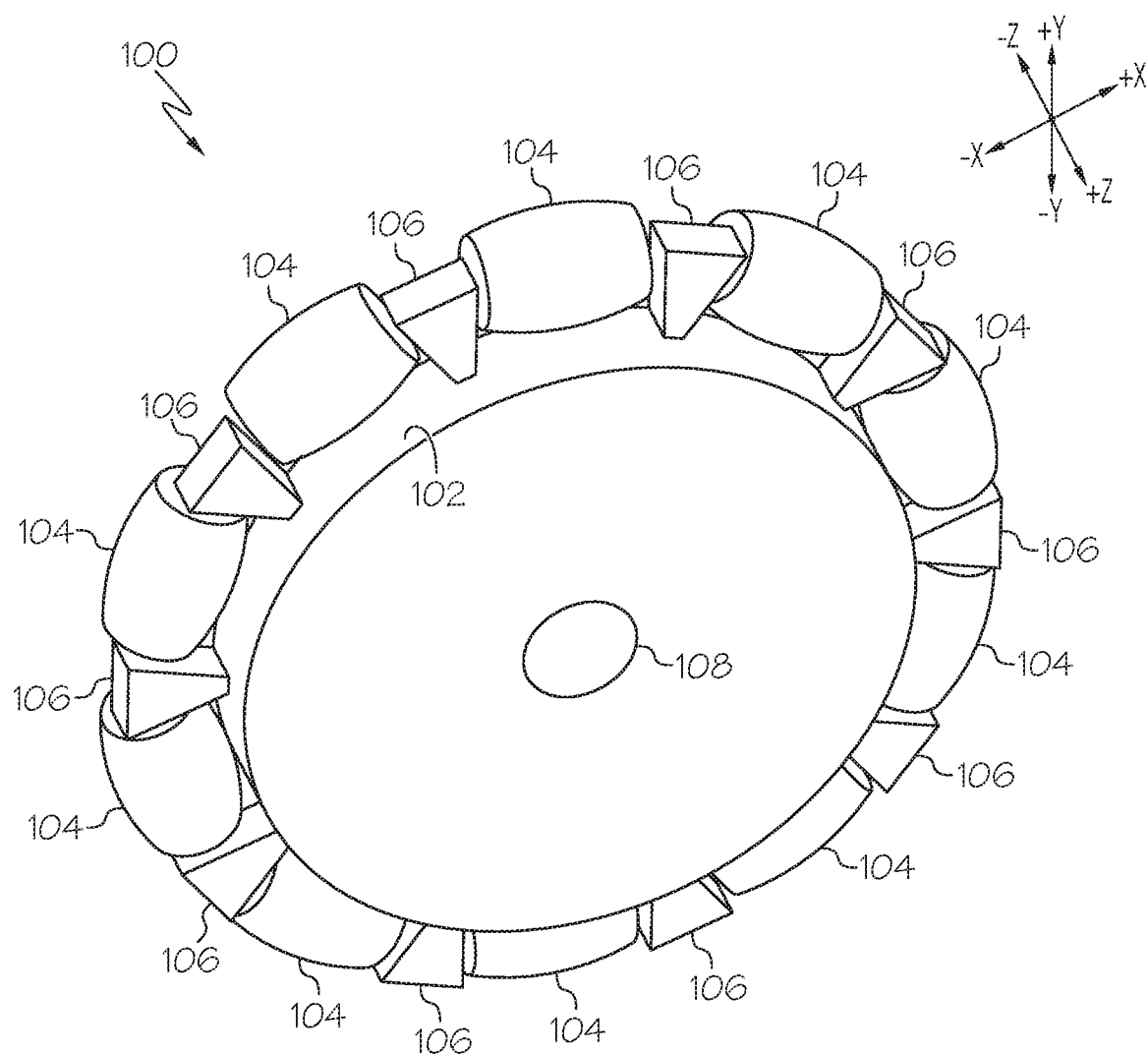
FIG. 1 schematically depicts an example omni-wheel, according to one or more embodiments shown or described herein.

FIG. 1 generally depicts an embodiment of an omni-wheel having a braking device arranged within the hub of the omni-wheel. The braking device may include plurality of rollers may be circumferentially arranged about the shaft and arranged radially outward from the shaft. The braking device may include a fluid-filled bladder and a plurality of braking pads. The fluid-filled bladder may be arranged about the shaft. The plurality of braking pads may be arranged between the fluid-filled bladder and the plurality of rollers. The fluid-filled bladder may expand radially outward when pressurized, displacing the plurality of braking pads radially outward to contact the plurality of rollers, preventing rotation of the rollers. Various embodiments of the braking device for omni-wheels will be described in greater detail herein.

As used herein, the term "longitudinal direction" refers to the forward-rearward direction (i.e., in the +/−X-direction of the depicted coordinate axes). The term "lateral direction" refers to the cross direction (i.e., in the +/−Z-direction of the depicted coordinate axes), and is transverse to the longitudinal direction. The term "vertical direction" refers to the upward-downward direction (i.e., in the +/−Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a centerline. The term "inboard" as used herein refers to the relative location of a component with respect to the centerline. Because the vehicle structures may be generally symmetrical about a centerline, the direction to which use of terms "inboard" or "outboard" and refer may be mirrored about the centerline when evaluating components positioned along opposite sides.

Referring again to FIG. 1, an example omni-wheel 100 is depicted. As illustrated, the omni-wheel 100 may include a hub 102, a plurality of rollers 104, a plurality of roller mounts 106, and a shaft 108. As will be described in greater detail herein, the arrangement of the roller 104 on the outer circumference of the omni-wheel 100 allows for the omni-wheel 100 to be translated in both the longitudinal and lateral directions without having to turn the omni-wheel 100. The rollers 104 of the omni-wheel 100 are separately rotatable from one another. It is noted that the present omni-wheel 100 may be used to move any type of device including terrestrial vehicles, wheel chairs, carts, robots, etc. The omni-wheel 100 may be non-rotatably coupled to the shaft 108 to allow power to be transferred down the shaft 108 to the omni-wheel 100.

Figure 2:
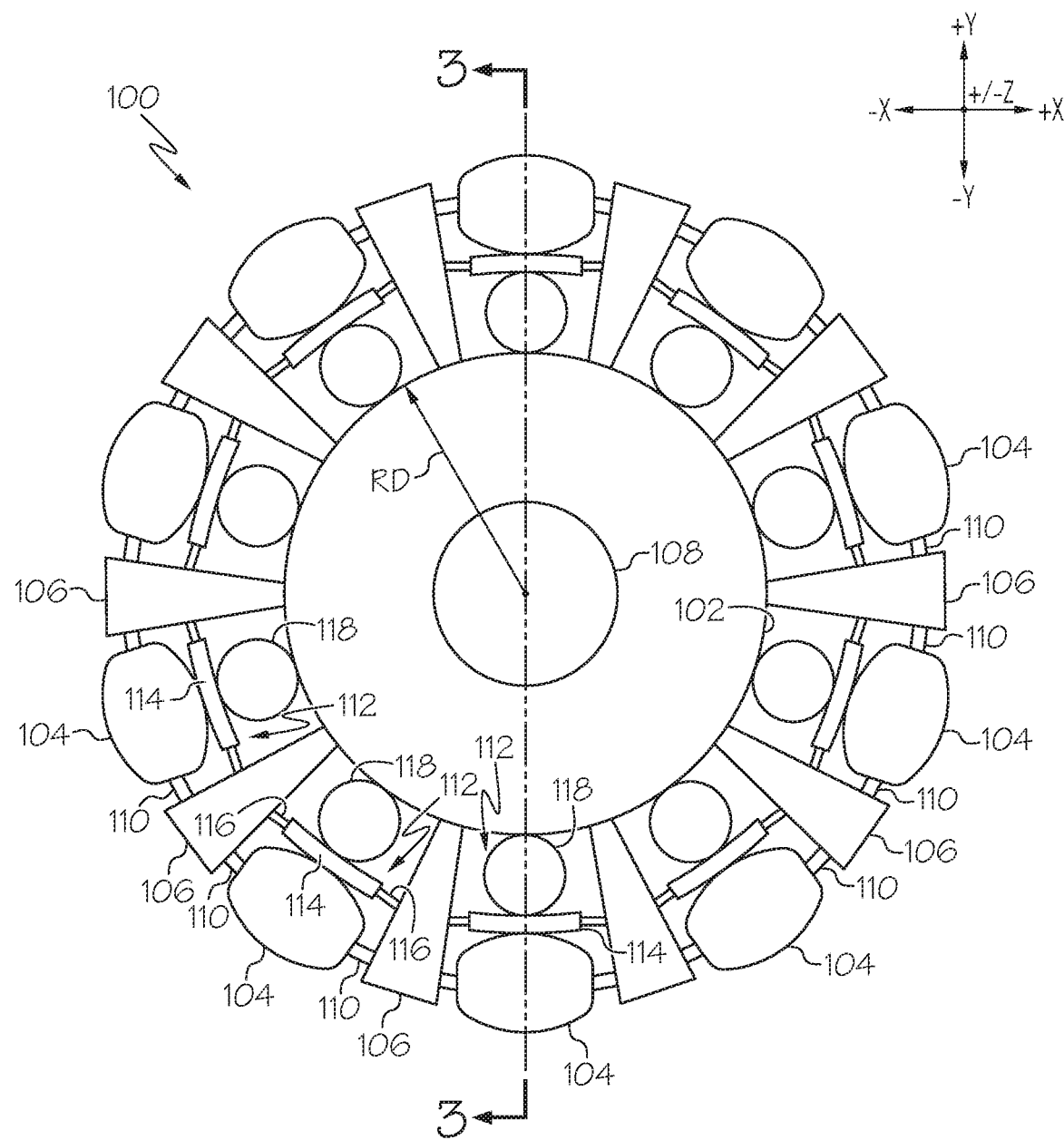
FIG. 2 schematically depicts the omni-wheel of FIG. 1 as viewed along the +/−Z-axis of the depicted coordinate axes, according to one or more embodiments shown or described herein.

Referring now to FIG. 2, the example omni-wheel 100 of FIG. 1 is depicted with a portion of the hub 102 removed. The omni-wheel 100 may include a plurality of braking devices 112, with each braking device 112 including a brake pad 114 and a fluid-filled bladder 118. The plurality of flexible brake pads 114 and fluid-filled bladders 118 may be arranged concentrically about the shaft 108 of the omni-wheel 100.

Still referring to FIG. 2, the rollers 104 may be barrel-shaped, cylindrical, frusto-conical, or the like. The rollers 104 may be arranged on the outer circumference of the hub 102 to contact the ground in either the longitudinal or lateral direction of travel. The rollers 104 are rotatably connected to the roller mounts 106 by a plurality of axles 110. A single axle 110 may pass completely through a roller 104 and secure the roller 104 to the roller mounts 106 arranged adjacent to the roller 104. Additionally, in an example embodiment, two (2) separate axles 110 may be used on either side of a roller 104 to secure the roller 104 to the adjacent roller mounts 106. The roller 104 may be manufactured of a hard rubber material, but other suitable materials may be used. The rollers 104 are arranged to ensure a smooth transition between each roller 104 as the omni-wheel 100 travels in the longitudinal direction, rotating in the X-Y plane. The outer surface of the rollers 104 may include grooves or treads which provide additional friction to the rollers 104 when contacting the ground. The rollers 104 may be radially offset from the hub 102 in the radial direction RD. It should be appreciate that other configurations of the rollers 104 are possible and that embodiments are not limited by the illustrated roller arrangement shown.

Referring still to FIG. 2, the plurality of braking devices 112 may each include a brake pad 114 and a fluid-filled bladder 118. The brake pad 114 is arranged on the outer diameter of the fluid-filled bladder 118. The brake pad 114 is secured to the roller mounts 106 by axle 116 and is configured to contact the rollers 104. Additionally, the brake pad 114 may be a material with high coefficient of friction for contacting the rollers 104. The brake pads 114 may be slidably engaged with the roller mounts 106 via the axles 116, or the brake pads 114 and/or the axles 116 may be deformable in the radial direction RD to allow the brake pads 114 to contact the rollers 104. In other embodiments, the brake pad 114 may be integral with the fluid-filled bladder 118. In other embodiments, the brake pads 114 may be not a separate component, but rather the outer surface of the fluid-filled bladders 118, additional material the fluid-filled bladders 118 are made from arranged on the outer surface of the fluid-filled bladders 118, or a coating applied to the fluid-filled bladders 118.

The number of braking devices 112 arranged within the omni-wheel 100 may correspond to the amount of rollers 104 arranged on the omni-wheel 100, where each roller 104 has a corresponding fluid-filled bladder 118 which can selectively brake the roller 104. Additionally, only a single braking device 112 may be used to either brake a single roller 104, or to brake multiple rollers 104 with a fluid-filled bladder 118. For example, the fluid-filled bladder 118 may be a circular bladder that expands radially outward in all directions when pressurized. Additionally, the fluid-filled bladder 118 may be a partial circular shape, such as a half circle, which interacts with multiple rollers 104 simultaneously. The fluid-filled bladders 118 may be flexible bladders which can increase the size of their outer diameter when pressurized. The fluid-filled bladders 118 may be any flexible material which can be sufficiently pressurized, such as rubber.

In an engaged, passive state, the fluid-filled bladders 118 are pressurized and the brake pads 114 are in an extended state to ensure contact with the rollers 104. By contacting the rollers 104 with the brake pads 114, rotation of the rollers 104 in the lateral direction (i.e., Y-Z plane) is prevented. The prevention of rotation of the rollers 104 in the lateral direction may increase maneuverability of the omni-wheel 100 in such a way as to prevent unwanted lateral movement of the omni-wheel 100. In other words, the omni-wheel 100, in an engaged, passive state preventing the rotation of the rollers 104, will function as a traditional wheel, only allowing rotation of the omni-wheel 100 in the longitudinal direction (i.e., X-Y plane) until the braking device 112 is activated to release the brake pad 114 from the outer surface of the roller 104.

Figure 3B:
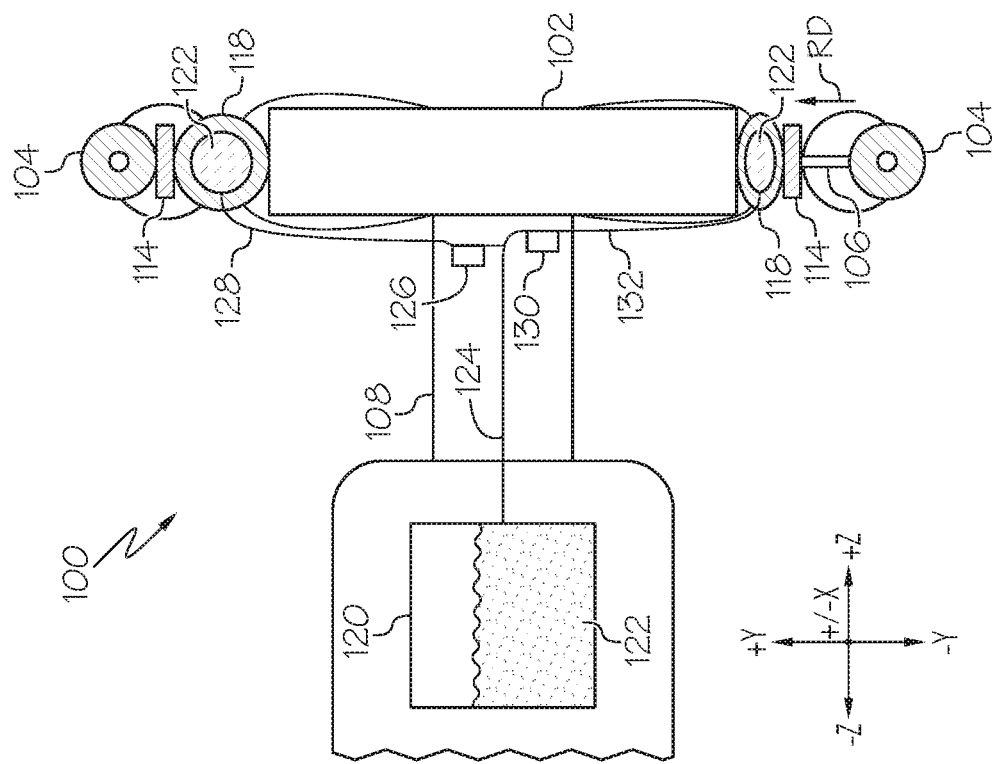
FIG. 3B schematically depicts a cross-sectional view of the omni-wheel of FIG. 2 taken generally along line 3-3 as viewed along the +/−X-axis of the depicted coordinate axes, according to one or more embodiments shown or described herein.
Figure 3A:
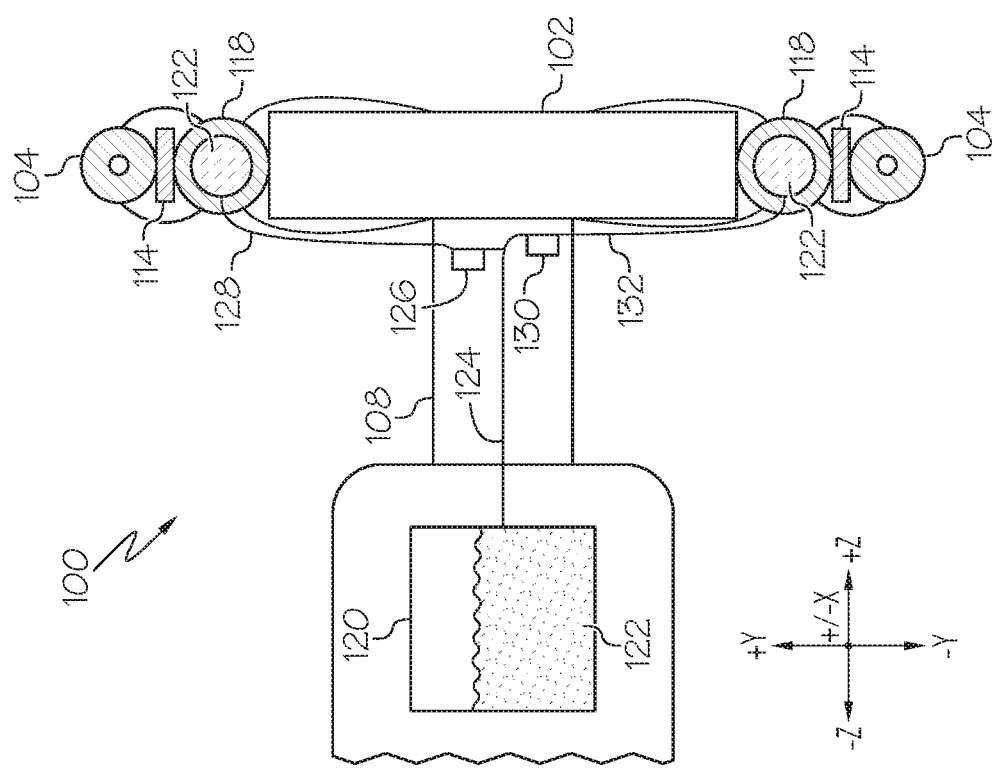
FIG. 3A schematically depicts a cross-sectional view of the omni-wheel of FIG. 2 taken generally along line 3-3 as viewed along the +/−X-axis of the depicted coordinate axes, according to one or more embodiments shown or described herein.

Referring now to FIGS. 3A and 3B, a cross-sectional view of the omni-wheel 100 taken along line 3-3 in FIG. 2 is shown. As noted above, the fluid-filled bladders 118 and brake pads 114 contact the rollers 104 to prevent lateral movement until the braking devices 112 are disengaged. The braking devices 112 are transitioned between engaged and disengaged states by a plurality of pumps 126, 130 fluidly coupled to a fluid reservoir 120 for pressurizing and depressurizing the fluid-filled bladders 118 with fluid 122. The fluid 122 may be air, water, or any fluid which can be used to pressurize the fluid-filled bladders 118. The pumps 126, 130 may be arranged about the shaft 108 or be arranged within the hub 102. The pumps 126, 130 may be fluidly coupled to the fluid reservoir 120 via fluid line 124. The pumps 126, 130 may be fluidly coupled to the fluid-filled bladders 118 via fluid lines 128, 132. The pumps 126, 130 may be electronically or mechanically controlled in order to pressurize the fluid-filled bladders 118.

Referring particularly to FIG. 3A, the braking device 112 is shown in an engaged state, where the brake pads 114 are contacting the rollers 104, and the fluid-filled bladders 118 are biased in the radially outward direction along the Y-axis by the pressure that fluid 122, present within the fluid-filled bladders 118, is exerting on the fluid-filled bladders 118, and in turn, on the brake pads 114. When the brake pads 114 are displaced radially outward along the Y-axis, the brake pads 114 contact the rollers 104 and prevent lateral rotation of the rollers 104 through a friction force exerted between the rollers 104 and the brake pads 114.

Referring now to FIG. 3B, the brake pad 114 of the roller 104 contacting the ground is shown in a disengaged state, where the brake pad 114 is not contacting the roller 104, and the fluid-filled bladder 118 corresponding to the roller 104 contacting the ground is retracted radially inward along the Y-axis by the corresponding pump 130. The design of the fluid-filled bladder 118 may be such that when depressurized, the unpressurized form of the fluid-filled bladder 118 is retracted radially inward along the Y-axis. Additionally, a bias member (not shown), such as a spring, may be used to push the fluid-filled bladder 118 radially inward along the Y-axis when the fluid-filled bladder is depressurized. As the fluid-filled bladder 118 is actuated by the pump 130 in the +Y direction, the brake pad 114 also corresponding to the roller 104 contacting the ground is also biased in the +Y direction. Since the brake pads 114 may be secured to the fluid-filled bladders 118, the brake pads 114 of the fluid-filled bladders 118 of the rollers 104 touching the ground also are retracted in the radial direction along the Y-axis. The pumps 126, 130 may be controlled by a processor or controller (not shown) communicatively coupled to the pumps 126, 130. The processor or controller may also be communicatively coupled to a sensor (not shown) secured to the omni-wheel 100 in order to determine which roller 104 is contacting the ground, in order to activate the correct pumps 126, 130 to disengage the brake pad 114 from the corresponding roller 104 touching the ground to allow for lateral movement. The sensor may be an angular position sensor which may be non-rotatably secured to the hub 102 or shaft 108, and is calibrated to the angular positions of each roller 104 and corresponding fluid-filled bladder 118.

In some embodiments, a gap may form between the rollers 104 and the brake pads 114 as the omni-wheel 100 rotates in the longitudinal direction (i.e., X-Y plane) and the rollers 104 contact the ground since the pumps 126, 130 are arranged to interact with the fluid-filled bladders 118 of corresponding rollers 104 contacting the ground by pressurizing or depressurizing the fluid-filled bladders 118. As the rollers 104 rotate in the X-Y plane and eventually contact the ground, the corresponding fluid-filled bladder 118 may be transitioned to a retracted state, moving the fluid-filled bladder 118 and brake pad 114 in the +Y direction, allowing the corresponding roller 104 to rotate. Additionally, in an embodiment, a gap may not form between the rollers 104 contacting the ground and the brake pads 114. However, the friction force between the rollers 104 and the brake pads 114 may be reduced, which would allow for rotation of the rollers 104 while still in near contact with the brake pads 114.

Due to the configuration of the plurality of fluid-filled bladders 118, only the fluid-filled bladders 118 with corresponding rollers 104 contacting the ground will be in a disengaged state, allowing rotation of only the rollers 104 contacting the ground. As the brake pads 114 and fluid-filled bladders 118 rotate with the shaft 108 in the X-Y plane, the fluid-filled bladders 118 abut against the hub 102 and the brake pads 114. As the rollers 104, which were previously not contacting with the ground approach contacting the ground, their corresponding fluid-filled bladders 118 will transition from an engaged state to a disengaged state by being depressurized by a corresponding pump 126, 130 when the processor (not shown) determines that the corresponding rollers are in contact with or about to be in contact with the ground in order to allow lateral movement. The processor (not shown) determines the location of each roller by reading in a signal from a sensor (not shown) to determine the angular position of each roller 104 with respect to the ground. In a disengaged state, the fluid-filled bladders 118 is actuated/depressurized by the pumps 126, 130 to bias the fluid-filled bladder 118 in the +Y direction. With the fluid-filled bladder 118 biased in the +Y direction, the brake pads 114 secured to the fluid-filled bladders 118 may also be moved in the +Y direction. This movement of the fluid-filled bladders 118 in the +Y direction disengages the brake pads 114 from the rollers 104, but only for the rollers 104 contacting the ground due to the arrangement of the fluid-filled bladders 118. Additionally, as the rollers 104 continue to rotate about the omni-wheel 100, the fluid-filled bladders 118 will remain in the depressurized state as the rollers 104 corresponding to the depressurized fluid-filled bladders 118 remain in contact with the ground. However, as the rollers 104 begin to lose contact with the ground due to their angular position on the omni-wheel 100, the corresponding fluid-filled bladders 118 will be pressurized to radially displace the brake pads 114 outward along the Y-axis. By pressurizing the fluid-filled bladders 118 in the radially outward direction, the brake pads 114 may contact the rollers 104 to again prevent rotation of the rollers 104.

Still referring to FIGS. 3A and 3B, the pumps 126, 130 may be actuated by a user (not shown), and may be a mechanical or electrical pump. As depicted in FIGS. 3A and 3B, the fluid reservoir 120, pump 126, and pump 130 are laterally offset from the hub 102 in the −Z direction and connected to the fluid-filled bladders 118 via the fluid lines 124, 128, 132. However, in an embodiment, the fluid reservoir 120, pump 126, and pump 130 may be arranged within the hub 102 of the omni-wheel 100, or the pumps 126, 130 may be directly fluidly coupled to the fluid-filled bladders 118 without the need for a fluid line.

Figure 4:
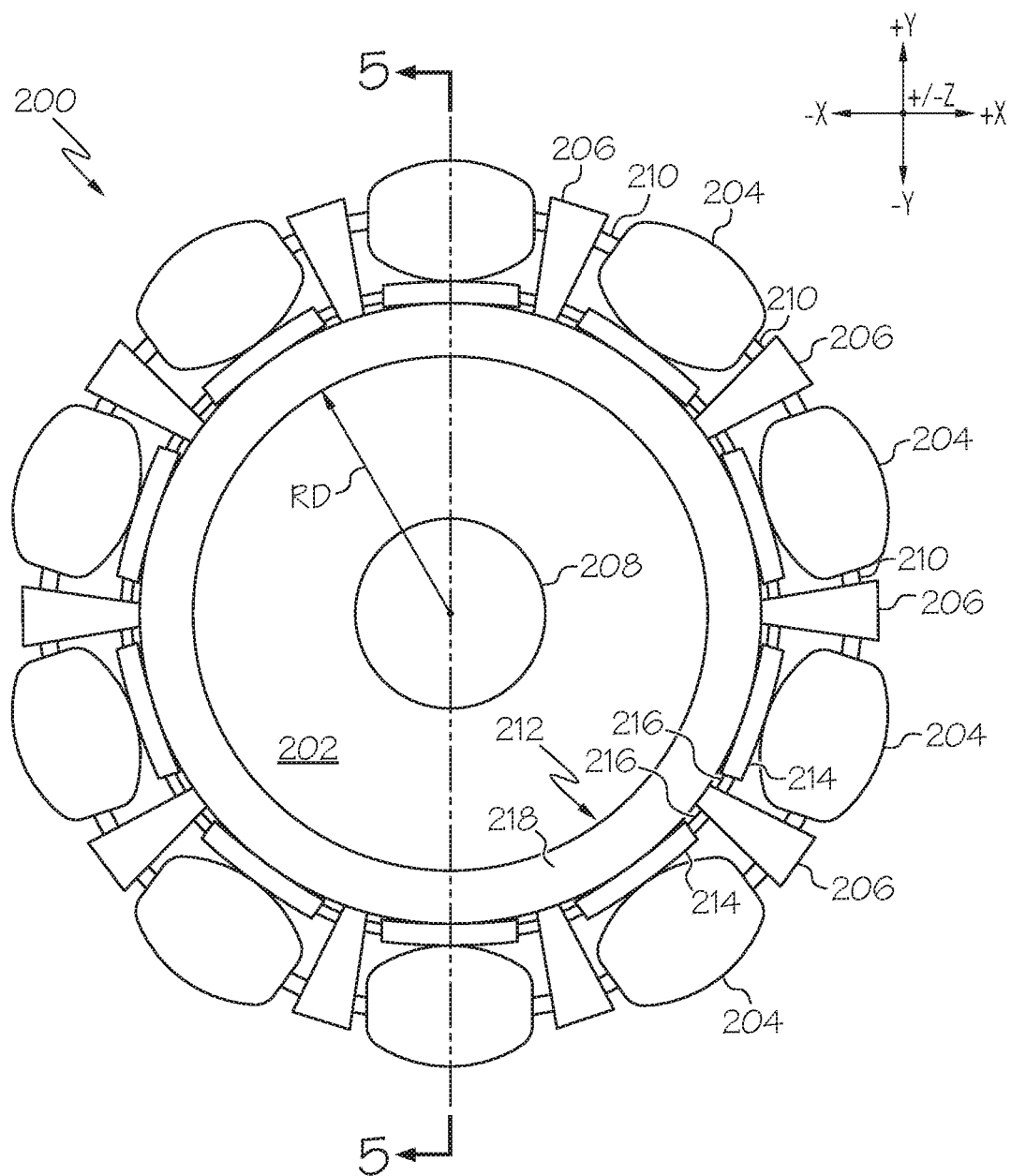
FIG. 4 schematically depicts another example omni-wheel as viewed along the +/−Z-axis of the depicted coordinate axes, according to one or more embodiments shown or described herein.

Referring now to FIG. 4, another example omni-wheel 200 is depicted with a portion of the hub 202 removed. The omni-wheel 200 is substantially similar to the omni-wheel 100, expect for a different braking device 212. The omni-wheel 200 may generally include a hub 202, rollers 204, roller mounts 206, a shaft 208, and a braking device 212.

Still referring to FIG. 4, the rollers 204 may be barrel-shaped, cylindrical, frusto-conical, or the like. The rollers 204 may be arranged on the outer circumference of the hub 202 to contact the ground in either the longitudinal or lateral direction of travel. The rollers 204 are rotatably connected to the roller mounts 206 by a plurality of axles 210. A single axle 210 may pass completely through a roller 204 and secure the roller 204 to the roller mounts 206 arranged adjacent to the roller 204. Additionally, in a non-limiting example, two (2) separate axles 210 may be used on either side of a roller 204 to secure the roller 204 to the adjacent roller mounts 206. The roller 204 may be manufactured of a hard rubber material, but other suitable materials may be used. The rollers 204 are arranged to ensure a smooth transition between each roller 204 as the omni-wheel 200 travels in the longitudinal direction, rotating in the X-Y plane. The outer surface of the rollers 204 may include grooves or treads which provide additional friction to the rollers 204 when contacting the ground. The rollers 204 may be radially offset from the hub 202 in the radial direction RD.

Referring still to FIG. 4, the braking device 212 may include a brake pad 214 and an fluid-filled bladder 218. The brake pad 214 is arranged on the outer diameter of the fluid-filled bladder 218. The brake pad 214 is secured to the roller mounts 206 by axle 216 and is designated to contact the rollers 204. Additionally, in an embodiment, the brake pad 214 may be a material with high coefficient of friction for contacting the rollers 204. The brake pads 214 may be slidably engaged with the roller mounts 206 via the axles 216, or the brake pads 214 and/or the axles 216 may be deformable in the radial direction RD to allow the brake pads 214 to contact the rollers 204. The brake pads 214 may be integral with the fluid-filled bladder 218. The fluid-filled bladder 218 may be a flexible bladder which can increase the size of its outer diameter when pressurized. The fluid-filled bladder 218 may be any flexible material which can be sufficiently pressurized, such as rubber. The fluid-filled bladder 218 is arranged concentrically about the hub 202 and/or shaft 208. Additionally, the fluid-filled bladder 218 may be non-rotatably connected to the hub 202 so that the same angular positions of the fluid-filled bladder 218 contact the same brake pads 214. Also, the fluid-filled bladder 218 may be rotatably connected to the hub 202 so that when in a disengaged state, the hub 202 will rotate about the shaft 208, but the fluid-filled bladder 218 will remain in the same position, with a different angular position of the fluid-filled bladder 218 contacting the brake pads 214 when the fluid-filled bladder 218 is pressurized.

The amount of brake pads 214 arranged within the omni-wheel 200 may correspond to the amount of rollers 204 arranged on the omni-wheel 200, where each roller 204 has a corresponding brake pad 214 which can selectively brake the roller 204. The fluid-filled bladder 218 may be a ring shaped bladder that interacts with all the brake pads 214 simultaneously when pressurized. In an engaged state, the fluid-filled bladder 218 and brake pads 214 are in an extended position to ensure contact with the rollers 204. By contacting the rollers 204 with the brake pads 214, rotation of the rollers 204 in the lateral direction (i.e., Y-Z plane) is prevented. The prevention of rotation of the rollers 204 in the lateral direction may increase maneuverability of the omni-wheel 200 in such a way as to prevent unwanted lateral movement of the omni-wheel 200. In other words, the omni-wheel 200, in an engaged, passive state preventing the rotation of the rollers 204, will function as a traditional wheel, only allowing rotation of the omni-wheel 200 in the longitudinal direction (i.e., X-Y plane) until the braking device 212 is activated to release the brake pad 214 from the outer surface of the roller 204.

Referring now to FIGS. 5A and 5B, a cross-sectional view of an omni-wheel 200 taken along line 5-5 in FIG. 4 is shown. As noted above, the fluid-filled bladder 218 and brake pads 214 contact the rollers 204 to prevent lateral movement until the brake pads 214 are disengaged from the rollers 204. The fluid-filled bladder 218 is transitioned between engaged and disengaged states by the pump 226. The pump 226 is fluidly coupled to a fluid reservoir 220, containing a fluid 222. The pump 226 is fluidly connected to the fluid-filled bladder 218 via a fluid line 228. The fluid-filled bladder 218 itself may be secured in an axial position along the Z-axis. Additionally, the fluid-filled bladder 218 may be rotatably or non-rotatably secured to the shaft 208 to allow the omni-wheel 200 to rotate in the longitudinal direction without the fluid-filled bladder 218 rotating with the omni-wheel 200.

Referring particularly to FIG. 5A, the brake pads 214 are shown in an engaged state, where the brake pads 214 are contacting the rollers 204, and the fluid-filled bladder 218 is biased in the radially outward direction along the Y-axis when pressurized by the pump 226.

Referring still to FIG. 5B, the brake pads 214 are in a disengaged state, where the brake pads 214 are not contacting the rollers 204, and the fluid-filled bladder 218 is retracted radially inward along the Y-axis by the pump 226. As the pump 226 is either activated to pressurize or depressurize the fluid-filled bladder 218, the fluid-filled bladder 118 is also biased along the Y-axis. Since the brake pads 214 may be secured to the fluid-filled bladders 218, the brake pads 214 also are retracted in the radial direction along the Y-axis when the fluid-filled bladder 218 is depressurized. The brake pads 214 are integral with the fluid-filled bladder 218, or may be a different material secured to the fluid-filled bladder 218 through an adhesive or mechanical connection. In other embodiments, the brake pads 214 may be not a separate component, but rather the outer surface of the fluid-filled bladder 218, additional material the fluid-filled bladder 218 is made from arranged on the outer surface of the fluid-filled bladder 218, or a coating applied to the fluid-filled bladder 218.

In some embodiments, a gap may form between the rollers 204 and the brake pads 214, as the fluid-filled bladder 218 is depressurized, allowing the rollers 204 to rotate. In other embodiments, a gap may not form between the rollers 204 and the brake pads 214. However, the friction force between the rollers 204 and the brake pads 214 may be reduced, which allows for rotation of the rollers 204 while still in near contact with the brake pads 214. In an embodiment, the brake pads 214 may contact the axles 210, with the rollers 204 being non-rotatably secured to the axles 210. The fluid-filled bladder 218 may be designed to engage all the brake pads 214 and rollers 204 simultaneously when pressurized by the pump 226, and to disengage from all of the brake pads 214 and rollers 204 simultaneously when depressurized by the pump 226.

Still referring to FIGS. 5A and 5B, the pump 226 may be actuated by a user (not shown), and may be a mechanical, pneumatic, or electrical actuator. As depicted in FIGS. 5A and 5B, the fluid reservoir 220 and the pump 226 are laterally offset from the hub 202 in the −Z direction and fluidly connected to the fluid-filled bladder 218 via the fluid lines 224, 228. However, the fluid reservoir 220 and the pump 226 may be arranged within the hub 202 of the omni-wheel 200, or the fluid reservoir 220 and the pump 226 may be directly connected to the fluid-filled bladder 218 without the need for fluid lines 224, 228.

Figure 6:
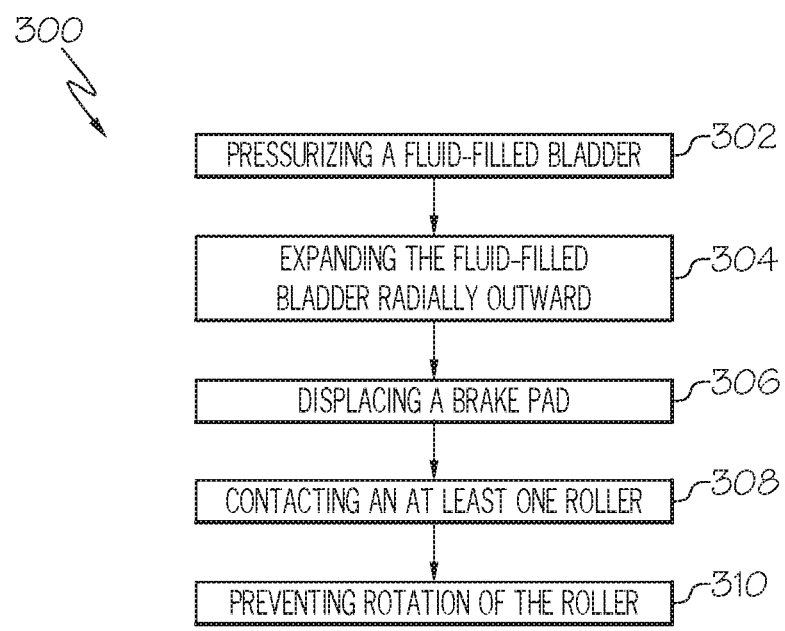
FIG. 6 depicts a method of using a braking device for an omni-wheel, according to one or more embodiments shown or described herein.

Referring now to FIG. 6, a flow chart depicting a method 300 for operating the braking device of the omni-wheel 100 (as illustrated in FIGS. 3A-4B) is depicted. It is noted that while a number of steps are shown in a specific order, embodiments may include a greater or fewer number of steps in varying orders without departing from the scope of the present disclosure. To begin, at step 302 the method 300 may include pressurizing a fluid-filled bladder 118 arranged about a shaft 108 of the omni-wheel 100. For example, and with reference to FIGS. 3A and 3B, the omni-wheel 100 may include a plurality of fluid-filled bladders 118 arranged about the shaft 108, with each fluid-filled bladder 118 being individually pressurized and depressurized by a plurality of pumps 126, 130. The fluid-filled bladders 118 may be pressurized with a fluid 122, such as air or water.

Referring again to FIG. 6, step 304 may include expanding the fluid-filled bladders 118 radially outward in the radial direction RD (i.e., the Y-axis). For example, and with reference to FIGS. 3A and 3B, the displacement of the fluid-filled bladders 118 radially outward along the Y-axis is due to the expansion of the fluid-filled bladder 118 caused by the pressure increase within the fluid-filled bladder 118 by the pump 130. In some embodiments, the amount of fluid-filled bladders 118 may equal the amount of rollers 104 arranged on the omni-wheel 100, or there may be a single fluid-filled bladder 218.

Referring again to FIG. 6, step 306 may include displacing a brake pad 114 arranged about the shaft 108 radially outward in the radial direction RD (i.e., the Y-axis). For example, and with reference to FIGS. 3A and 3B, the brake pads 114 are arranged on the outer surfaces of the fluid-filled bladders 118 and contact the rollers 104. In some embodiments, the brake pads 114 are integral with the fluid-filled bladders 118, or may be a different material secured to the fluid-filled bladders 118.

Referring again to FIG. 6, step 308 may include contacting an at least one roller 104 of the omni-wheel 100 with the brake pad 114. For example, and with reference to FIGS. 3A and 3B, the brake pads 114 directly contact the outer surfaces of the rollers 104 and prevent rotation of the rollers 104 in the lateral direction (i.e., Z-axis) through a friction force imparted to the rollers 104 from the brake pads 114. In some embodiments, the brake pads 114 may contact the axles 110, which secure the rollers 104 to adjacent roller mounts 106, in order to prevent rotation of the rollers 104.

Referring again to FIG. 6, step 310 may include preventing rotation of the roller 104 due to the contact between the brake pad 114 and the roller 104. For example, and with reference to FIGS. 3A and 3B, the brake pads 114 are secured to the fluid-filled bladders 118, and are displaced in the outward radial direction RD in order to contact the rollers 104. In some embodiments, the pump 130, which pressurizes the fluid-filled bladders 118, displacing the brake pads 114, remains in an pressurized state in order to hold the brake pads 114 in contact with the rollers 104 to prevent rotation of the rollers 104.

It should now be understood that embodiments described herein are directed to omni-wheels having a braking device arranged therein. The omni-wheel may include a shaft, a plurality of rollers, and the braking device to selectively brake the rollers. The plurality of rollers may be circumferentially arranged about the shaft and arranged radially outward from the shaft to allow the omni-wheel to function as a traditional wheel. The braking device may include at least one fluid-filled bladder, at least one brake pad, and a pump to pressurize/depressurize the fluid-filled bladder between an engaged and disengaged state. The at least one brake pad may be arranged on the fluid-filled bladder. The fluid-filled bladder may expand radially outward when pressurized by the pump, which may displace the at least one brake pad arranged on the fluid-filled member radially outward to contact at least one of the plurality of rollers, preventing rotation of the roller in the lateral direction.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An omni-wheel, comprising:
a shaft;
a plurality of rollers circumferentially arranged about the shaft and arranged radially outward from the shaft;
a braking device, comprising:
a fluid-filled bladder circumferentially arranged about the shaft; and
a plurality of braking pads arranged between the fluid-filled bladder and the plurality of rollers;
wherein the fluid-filled bladder expands radially outward when pressurized, displacing the plurality of braking pads radially outward to contact the plurality of rollers, thereby preventing rotation of the rollers, and the fluid-filled bladder is rotatably coupled to the plurality of brake pads, such that the fluid-filled bladder remains stationary as the plurality of brake pads rotate about the shaft.

2. The omni-wheel of claim 1, further comprising a pump fluidly coupled to the fluid-filled bladder to pressurize and depressurize the fluid-filled bladder.

3. The omni-wheel of claim 2, further comprising a fluid reservoir fluidly coupled to the pump and the fluid-filled bladder.

4. The omni-wheel of claim 3, wherein the fluid-filled bladder is pressurized with air.

5. The omni-wheel of claim 3, wherein the fluid-filled bladder is pressurized with water.

6. An omni-wheel, comprising:
a shaft;
a plurality of rollers circumferentially arranged about the shaft and arranged radially outward from the shaft;
a braking system, comprising:
a plurality of braking devices arranged about the shaft, each braking device comprising:
a fluid-filled bladder, wherein the fluid-filled bladder is radially aligned with an individual roller of the plurality of rollers; and
a braking pad arranged between the fluid-filled bladder and an individual roller of the plurality of rollers;
wherein the fluid-filled bladder of the plurality of fluid-filled bladders is individually pressurized and expands radially outward when pressurized, displacing a braking pad of the plurality of braking pads radially outward to contact a roller of the plurality of rollers, thereby preventing rotation of the roller, and the fluid-filled bladder is rotatably coupled to the plurality of brake pads, such that the fluid-filled bladder remains stationary as the plurality of brake pads rotate about the shaft.

7. The omni-wheel of claim 6, further comprising a pump fluidly coupled to each of the fluid-filled bladders of the braking system to pressurize and depressurize the fluid-filled bladders.

8. The omni-wheel of claim 7, further comprising a fluid reservoir fluidly coupled to the pump and to each of the fluid-filled bladders of the braking system.

9. The omni-wheel of claim 8, wherein the fluid-filled bladders are pressurized with air.

10. The omni-wheel of claim 8, wherein the fluid-filled bladders are pressurized with water.

11. A method of braking an omni-wheel, the method comprising:
pressurizing a fluid-filled bladder arranged about a shaft of the omni-wheel; and
expanding the fluid-filled bladder radially outward to displace a brake pad arranged about the shaft radially outward, such that the brake pad contacts at least one roller of the omni-wheel, thereby preventing rotation of the roller, and wherein the fluid-filled bladder is rotatably coupled to the plurality of brake pads, such that the fluid-filled bladder remains stationary as the plurality of brake pads rotate about the shaft.

12. The method of claim 11, wherein the at least one roller of the omni-wheel is prevented from rotating only when contacting the ground.

13. The method of claim 12, wherein the fluid-filled bladder is pressurized via a pump fluidly coupled to the fluid-filled bladder.

14. The method of claim 13, further comprising depressurizing the fluid-filled bladder to collapse the fluid-filled bladder radially inward, such that the brake pad arranged about the shaft is displaced radially inward, thereby disengaging the brake pad with the at least one roller of the omni-wheel.

15. The method of claim 14, wherein the brake pad is biased radially inward to disengage the at least one roller when the fluid-filled bladder is depressurized.

* * * * *